Patented Oct. 9, 1934

1,975,959

UNITED STATES PATENT OFFICE 1,975,959

POLYMERIZATION OF VINYL COMPOUNDS IN THE PRESENCE OF FILM FORMING MATERIALS

Walter E. Lawson, Wilmington, Del., and Lloyd T. Sandborn, Wausau, Wis., assignors to E. I. du Pont de Nemours & Company, Wilmington, Del., a corporation of Delaware No Drawing. Application May 13, 1930, Serial No. 452,119

30 Claims. (Cl. 134—26)

This invention relates to new compositions of matter. More specifically it relates to new compositions of matter formed by the combination of vinyl compounds with film-forming materials. Still more specifically it refers to the use in coating and plastic compositions of the new compositions of matter prepared by our invention.

The resins prepared by the polymerization of vinyl compounds have certain characteristics which make their use in plastic and coating compositions desirable. They have, however, certain other characteristics which act to limit their use for these purposes. For example, some of them although of excellent color and easy preparation lack sufficient durability. It was believed that, by incorporating with these resins film-forming materials possessing in high degree a property lacked by the vinyl polymer, a resin of improved characteristics would be produced. For instance, in the above example it was proposed to combine a film-forming material having excellent durability with a vinyl compound having poor durability. It was discovered, however, that these attempts to combine film-forming materials with vinyl polymers were often unsuccessful because of incompatibility, or because the resulting products gave cloudy films, or because mixtures more or less insoluble in ordinary solvents were produced. Consequently, except in some instances, homogeneous products could not be produced from vinyl polymers and film-forming materials.

It is an object of this invention to form new compositions of matter which contain a polymerized vinyl compound and another film-forming material. Another object of the invention is the preparation of new compositions of matter by combining a vinyl compound with such film-forming materials as cellulose derivatives, resins, and oils in such a manner that the resulting product will be clear and of good solubility in ordinary solvents.

These objects are attained, generally speaking, by polymerizing a vinyl compound or a combination of vinyl compounds in the presence of a film-forming material, or of a combination of film-forming materials, by the action of heat or by the action of actinic light, with or without the presence of a catalyst. These objects are further attained by polymerizing a vinyl derivative in the presence of a film-forming material possessing those properties in high degree which the vinyl polymer alone would possess only in low degree.

The term "film-forming materials" as herein used includes resins, natural or synthetic, drying oils, and cellulose derivatives. Within the term "resins" is included both natural and synthetic resins, among which, for purposes of illustration, mention is made of rosin, ester gum, the resins which go by that name and the resins, such as gum Kauri, which are commonly called gums.

Our process can be carried out with any polymerizable vinyl compound. Furthermore, any film-forming material may be successfully used, but we have noticed that variation of the manipulation can sometimes be advantageously resorted to with different materials. For example, vinyl chloride and linseed oil were polymerized by heat in the presence of a benzoyl peroxide catalyst, but in polymerizing styrene in the presence of linseed oil it was discovered that the reaction proceeded more satisfactorily in the absence of a catalyst.

We have observed differences in the qualities of the resins produced by our process, some of them having better properties and being of greater utility than others.

Our invention can be carried out either by polymerizing the selected materials in the presence of heat or by polymerizing them by the action of actinic light, or both. The presence of a catalyst is often advantageous.

We have discovered that, where the new compositions of matter are to be used in coating compositions, advantageous results are obtained by carrying out the reaction in the presence of a solvent, which insures the production of a soluble product. The use of a solvent for the raw materials which is also a solvent for the resinous product is advantageous because it eliminates the necessity of dissolving the resinous product before using it in a coating composition; the resinous solution can be taken directly from the polymerizing apparatus and used in a coating composition. If it is desired to separate the resinous product from the solvent, the separation can be carried out by any suitable method such, for example, as by steam distillation.

If the production of a resin suitable for use in the plastic arts is desired, the polymerization is often advantageously carried out in the absence of a solvent.

The process of polymerization can be carried out by a batch process or by means of a continuous flow process.

The following examples are illustrative and are not to be deemed in any sense limitative:

Example I

A mixture of 110 grams styrene, 20 grams soluble bakelite resin and 140 grams ethyl benzene solvent was heated at 140° C. for 48 hours. The solution obtained in this manner, which contained 20 grams bakelite resin and approximately 110 g. meta styrene, gave clear films. Coating compositions prepared from this product are much more durable than those prepared from meta styrene.

Example II

A mixture of 90 grams styrene, 60 grams ester gum, 0.9 gram benzoyl peroxide, and 210 grams ethyl benzene was heated for five hours at 120–310° C. The product obtained in this way gave clear films. Analysis of the product showed that it contained considerable polymerized styrene.

Example III

A solution containing 112.5 grams styrene, 70 grams pyroxylin, 35 grams ester gum, 137.5 grams ethyl benzene, and 500 grams butyl acetate was heated for 16 hours at 110° C. When the mixture was steam distilled, 142 grams of resinous product was obtained. This product, which contained about 25% meta styrene, gave perfectly clear films, whereas films flowed from solutions prepared by mechanically mixing pyroxylin, ester gum, and meta styrene in this proportion showed distinct incompatibility.

Example IV

A solution containing 1200 grams styrene, 1800 grams ethyl benzene, 150 grams solid China-wood oil, 75 grams rosin, and 12 grams benzoyl peroxide was heated for six hours at 120°–125° C. The product isolated as in the preceding examples weighed 682 grams, indicating that it contained 67% meta styrene, 22% solid China-wood oil, and 11% rosin. The product gave clear films.

Example V

A mixture containing 1200 grams styrene, 1800 grams ethyl benzene, 150 grams solid China-wood oil, 75 grams rosin-modified glyptal resin, and 12 grams benzoyl peroxide was heated at 120–125° C. for six hours. From the reaction mixture 738 grams of resinous product was obtained which would indicate that it contained 69.5% polymerized styrene, 20.3% solid China-wood oil, and 10.2% glyptal resin. Films of the product were perfectly clear.

Example VI

A mixture containing 40 parts styrene, 60 parts ethyl benzene, 10 parts of the filtrate obtained in the manufacture of solid China-wood oil, 10 parts Amberol, and 0.5 part benzoyl peroxide was heated at 120°–130° C. for six hours. Thirty-one parts of resinous product was isolated from the reaction mixture. Films of the product showed no signs of incompatibility.

Example VII

A mixture of 945 grams styrene, 150 grams pyroxlin, 1155 grams ethyl benzene, and 1800 grams butyl acetate was heated at 110° C. for 22 hours. The mixture was steam distilled to remove the solvent and unpolymerized styrene from the resinous product. The product weighed 686 grams, indicating that it contained 78% meta styrene and 22% pyroxlin. Films from this product were perfectly clear and were more durable than those of meta styrene alone. Meta styrene prepared in the absence of pyroxlin is incompatible with pyroxlin.

Example VIII

A mixture of 1200 grams vinyl chloride, 250 g. raw linseed oil, 800 g. toluene, and 48 g. benzoyl peroxide was passed through a lead-lined tube three feet in length having a capacity of 463 cc. at a rate of 300 cc. per hour under a pressure of 500 pounds per square inch and at a temperature of 120° C. The solution obtained by this process gave clear films. Analysis showed that 40% of the solids content of the solution consisted of polymerized vinyl chloride.

Example IX

A mixture of 1200 g. vinyl chloride, 250 g. blown linseed oil, 550 g. toluene, and 48 g. benzoyl peroxide was treated as in Example VIII. The solution obtained in this manner contained approximately equal parts of polyvinyl chloride and drying oil. Films flowed from this solution were perfectly clear.

Example X

A mixture of 110 grams styrene, 10 grams alkali refined linseed oil, and 140 grams ethyl benzene was heated at 140° C. for 48 hours, causing substantially complete polymerization of the styrene. The resultant solution gave clear films. Meta styrene prepared in the absence of linseed oil is incompatible with linseed oil.

Example XI

A mixture of 1500 g. vinyl chloride, 150 g. raw China-wood oil, 1000 g. toluene, and 45 g. benzoyl peroxide was passed through a three-foot, lead-lined tube having a capacity of 463 cc. at a rate of 300 cc. per hour under a pressure of 500 pounds per square inch and at a temperature of 115°–120° C. The solution obtained in this way contained 20% solids and had a viscosity of about 0.1 poise at 20° C. Clear films were obtained from this solution.

Example XII

A mixture containing 900 grams styrene, 2100 grams ethyl benzene, 112 grams blown China-wood oil, and 7 grams benzoyl peroxide was heated for five hours at 120°–125° C. The reaction mixture was then steam distilled to remove ethyl benzene and unpolymerized styrene. The non-volatile product (resin) after drying weighed 480 grams, which would indicate that it contained 23.3% oil, assuming that the oil was non-volatile with steam.

Example XIII

A mixture of 44 grams styrene, 4 grams ethyl benzene, 20 grams toluene, 20 grams benzene, 5 grams solid China-wood oil, and 0.5 gram benzoyl peroxide was refluxed for five hours. The resinous product isolated as in Example XII, weighed 19 grams, indicating that it contained 26.3% oil. Films of this product were clear, whereas those obtained by mixing ordinary meta styrene and solid China-wood oil in these proportions were cloudy.

Example XIV

A mixture of 10 g. polyhydric alcohol-polybasic acid resin (glyceryl triphthalate), 40 g. vinyl acetate, 90 g. acetone, and 0.5 benzoyl peroxide was heated under reflux. After three hours heating, 0.5 g. additional benzoyl peroxide was added and the mixture was refluxed for eight hours. When the solvent was removed from the mixture by distillation, 30 g. of resinous product was obtained, indicating that it contained 20 g. of polymerized vinyl acetate. Films flowed from solutions of this product were perfectly clear, whereas films flowed from solutions prepared by simply mixing the polyhydric alcohol-polybasic resin and polymerized vinyl acetate in this ratio were distinctly cloudy.

*Example XV*

A mixture containing 2700 g. vinyl chloride, 54 g. of an oil-modified polyhydric alcohol-polybasic acid resin, 1800 g. toluene, 23 g. Hi-flash naphtha, and 108 g. benzoyl peroxide was passed through a one and one-half foot lead-lined tube of 230 cc. capacity at a rate of 300 cc. per hour under a pressure of 500 lbs. per sq. in. and at a temperature of 115° C. The solution which was obtained in this manner contained 37.7% solids and gave films which were perfectly clear. Solutions containing a higher ratio of polyhydric alcohol-polybasic acid resin to polyvinyl chloride can be prepared in the same manner by using less vinyl chloride.

*Example XVI*

A mixture of 5 g. ester gum, 50 g. vinyl acetate, and 1 g. benzoyl peroxide was refluxed for five hours. The unpolymerized vinyl acetate was removed from the mixture by distillation, leaving a residue consisting of 14 g. polymerized vinyl acetate and 5 g. ester gum. Solutions of this product gave clear films. Polymerized vinyl acetate prepared in the absence of ester gum is incompatible with ester gum in a 14:5 ratio.

*Example XVII*

A typical spraying enamel prepared from the resin of Example XII had the following composition:

|  | Parts |
|---|---|
| Meta styrene-blown China-wood oil resin | 130.5 |
| Dixylyl ethane softener | 26.0 |
| Drier solution | 3.1 |
| Titanox pigment | 112.5 |
| Benzene solvent | 58.8 |
| Toluene solvent | 176.5 |
| Xylene solvent | 156.7 |

This enamel had a viscosity less than 0.4 poise at 25° C., and had satisfactory spraying characteristics. Its films became tack-free in 70 minutes, and hard in 10 hours. Panels coated with this enamel have shown no failure in nine months outdoor exposure, whereas similar enamels containing ordinary meta styrene and a softener such as dixylyl ethane or dibutyl phthalate, showed failure by cracking within three or four months.

The above examples have been selected with the object of indicating that the process is applicable generally to vinyl compounds, and is applicable generally to film-forming materials. In the above examples the three vinyl compounds which are considered most important at this time have been used. These vinyl compounds are vinyl chloride, vinyl benzene, and vinyl acetate. It is to be understood that these vinyl compounds are illustrative and are not limitative because the process is applicable to all polymerizable vinyl compounds. With the vinyl compounds in the above examples there has been illustrated the use of three general classes of film-forming materials, the drying oils, the resins, and the cellulose derivatives.

Of the oils China-wood oil and linseed oil are illustrated in the examples. The utility of these oils in their various conditions has been demonstrated by showing the satisfactory character of raw China-wood oil, of blown China-wood oil, of solid China-wood oil, and of China-wood oil filtrate. It has further been demonstrated that the process proceeds satisfactorily in the presence of mixtures of film-forming materials such as of mixtures of oils and resins or mixtures of cellulose derivatives and other film-forming materials. It is to be understood that the specific reference to the particular oils used in the examples is not limitative but is illustrative only, the process being applicable to drying oils generally.

Of the natural resins the examples disclose rosin, but it is to be understood that the other natural resins, including cumar and gum Kauri, are equally applicable. Of the synthetic resins the examples disclose polyhydric alcohol-polybasic acid resins, Amberol, ester gum, and bakelite. It is to be understood, again, that the references to these specific resins are not limitative but are illustrative, the process being generally applicable to synthetic resins and including synthetic resins of the cumarone indene type.

Of cellulose derivatives the examples disclose the use of pyroxylin and of pyroxylin in combination with other film-forming materials but this reference is not to be considered limitative but illustrative inasmuch as the other cellulose derivatives, including ethyl cellulose, are useful in our process.

Only benzoyl peroxide has been cited in the examples as a catalyst but it is to be noted that other catalysts which are suitable for catalyzing the polymerization of vinyl compounds are suitable for the polymerization of vinyl compounds in the presence of film-forming materials. Among these catalysts may be mentioned peroxides, ozone, and ozonides for catalyzing the heat polymerization, and uranyl salts, such as uranyl nitrate, for catalyzing the polymerizaton by actinic light.

In certain of the claims the term "inert solvent" is used. The use of this term does not mean that the solvent employed is not an active solvent, but does mean that the solvent employed does not react with the vinyl derivative and the film-forming material to form a major proportion of the product resulting from polymerization. For instance, when styrene is reacted with linseed oil, in ethyl benzene solvent, as in Example X, the resulting product is substantially a reaction product of styrene and linseed oil. The ethyl benzene, not having become an integrated part of the resulting product, is considered "inert".

The procedure in the above examples can be varied widely. For instance, the heat periods can be lengthened or shortened materially, and the temperatures can be varied widely. Temperatures between 90° C. and 150° C. yield preferred results although other temperatures with proper manipulation may be used. The other factors in the examples are also flexible. We have observed that syntheses can be carried out with certain vinyl compounds without the use of pressure but that when the vinyl derivative is vinyl chloride pressures about 400 pounds per square inch are to be preferred, although other pressures can be used with proper manipulation of the other factors. If it is desired, anti-darkening agents can be added to the raw materials before polymerization to insure a product of excellent color, and the viscosity of the resulting solution can be adjusted by appropriate methods, such as by the method described in the copending case of Dr. J. H. Werntz, Serial No. 432,556, filed March 1, 1930.

Among the advantages of this invention are the discovery of methods whereby polymerized vinyl compounds may be combined with film-forming materials, the production of new resinous compositions of matter combining the good qualities of polymerized vinyl compounds with those of other film-forming materials, and the production from these resins of superior coating and plastic compositions.

As many apparently widely different embodiments of this invention may be made without departing from the spirit and scope thereof, it is to be understood that we do not limit ourselves to the specific embodiments thereof except as defined in the appended claims.

We claim:

1. A composition of matter formed by polymerizing in a mutual, inert solvent a vinyl compound of the class consisting of vinyl esters and styrene in the presence of a film forming material of the class consisting of a cellulosic film forming material, a resin, and a drying oil.

2. A new composition of matter comprising a vinyl compound of the class consisting of vinyl esters and styrene polymerized in the presence of a drying oil while dissolved in a mutual, inert solvent.

3. A new composition of matter comprising a vinyl compound of the class consisting of vinyl esters and styrene polymerized in the presence of a cellulosic film-forming material while dissolved in a mutual solvent.

4. A new composition of matter comprising a vinyl compound of the class consisting of vinyl esters and styrene polymerized in the presence of a resin while dissolved in a mutual, inert solvent.

5. A new composition of matter comprising styrene polymerized in the presence of a film-forming material, taken from the class consisting of a cellulosic film-forming material, a resin, and a drying oil, while dissolved in a mutual, inert solvent.

6. A new composition of matter comprising styrene polymerized in the presence of a drying oil while dissolved in a mutual, inert solvent.

7. A new composition of matter comprising styrene polymerized in the presence of a cellulosic film-forming material while dissolved in a mutual solvent.

8. A new composition of matter comprising styrene polymerized in the presence of a resin while dissolved in a mutual, inert solvent.

9. A new composition of matter formed by heating at a temperature between 90° C. and 150° C. a mixture containing styrene, a cellulose derivative, a resin, and a solvent.

10. A new composition of matter formed by heating at a temperature between 90° C. and 150° C. a mixture containing styrene, pyroxylin, a resin, and a solvent.

11. A new composition of matter formed by heating for about sixteen (16) hours at a temperature of about 110° C. a solution containing 112.5 parts styrene, 70 parts pyroxylin, 35 parts ester gum, 137.5 parts ethyl benzene, and 500 parts butyl acetate.

12. The process which comprises polymerizing a vinyl compound of the class consisting of vinyl esters and styrene in the presence of a film-forming material of the class consisting of drying oils, cellulose compounds, and resins, in the presence of a mutual, inert solvent.

13. The process which comprises polymerizing a vinyl compound of the class consisting of vinyl esters and styrene in the presence of a drying oil while dissolved in a mutual, inert solvent.

14. The process which comprises polymerizing a vinyl compound of the class consisting of vinyl esters and styrene in the presence of a cellulosic film-forming material while dissolved in a mutual, inert solvent.

15. The process which comprises polymerizing a vinyl compound of the class consisting of vinyl esters and styrene in the presence of a resin while dissolved in a mutual, inert solvent.

16. The process which comprises dissolving styrene and a film-forming material of the class consisting of drying oils, cellulose compounds, and resins, in a mutual, inert solvent, and subjecting the solution to conditions capable of polymerizing the styrene product.

17. The process which comprises polymerizing styrene in the presence of a drying oil in the presence of a mutual, inert solvent.

18. The process which comprises polymerizing styrene in the presence of a cellulosic film-forming material in a mutual solvent.

19. The process which comprises polymerizing styrene in the presence of a resin in a mutual, inert solvent.

20. A coating composition containing the composition of matter described in claim 1 and a solvent.

21. A coating composition containing the composition of matter described in claim 2 and a solvent.

22. A coating composition containing the composition of matter described in claim 3 and a solvent.

23. A coating composition containing the composition of matter described in claim 4 and a solvent.

24. A coating composition containing the composition of matter described in claim 5 and a solvent.

25. A coating composition containing the composition of matter described in claim 6 and a solvent.

26. A coating composition containing the composition of matter described in claim 7 and a solvent.

27. A coating composition containing the composition of matter described in claim 8 and a solvent.

28. A coating composition containing the composition of matter described in claim 9 and a solvent.

29. A coating composition containing the composition of matter described in claim 10 and a solvent.

30. A coating composition containing the composition of matter described in claim 11 and a solvent.

WALTER E. LAWSON.
LLOYD T. SANDBORN.